US009282379B2

(12) United States Patent
Chang et al.

(10) Patent No.: US 9,282,379 B2
(45) Date of Patent: *Mar. 8, 2016

(54) SYSTEM AND METHOD IN A BROADBAND RECEIVER FOR EFFICIENTLY RECEIVING AND PROCESSING SIGNALS

(71) Applicant: MaxLinear, Inc., Carlsbad, CA (US)

(72) Inventors: Glenn Chang, Carlsbad, CA (US); Timothy Gallagher, Encinitas, CA (US); Sridhar Ramesh, Carlsbad, CA (US)

(73) Assignee: MAXLINEAR, INC., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/733,198

(22) Filed: Jun. 8, 2015

(65) Prior Publication Data

US 2015/0350743 A1  Dec. 3, 2015

Related U.S. Application Data

(63) Continuation of application No. 13/326,125, filed on Dec. 14, 2011, now Pat. No. 9,055,329.

(60) Provisional application No. 61/487,979, filed on May 19, 2011.

(51) Int. Cl.
H04N 21/61 (2011.01)
H04N 21/436 (2011.01)
H04N 21/438 (2011.01)
H04N 21/4402 (2011.01)
(Continued)

(52) U.S. Cl.
CPC ........ H04N 21/6143 (2013.01); H04N 21/434 (2013.01); H04N 21/4341 (2013.01); H04N 21/4343 (2013.01); H04N 21/4347 (2013.01); H04N 21/4382 (2013.01); H04N 21/4383 (2013.01); H04N 21/43615 (2013.01); H04N 21/440209 (2013.01); H04N 21/60 (2013.01); H04N 21/6193 (2013.01); H04N 21/64 (2013.01); H04N 21/6402 (2013.01); H04N 21/64322 (2013.01); H04N 21/64746 (2013.01); H04N 21/64761 (2013.01)

(58) Field of Classification Search
None
See application file for complete search history.

(56) References Cited

U.S. PATENT DOCUMENTS

2008/0060024 A1  3/2008  Decanne
2009/0007189 A1  1/2009  Gutknecht
2009/0113492 A1  4/2009  Norin

FOREIGN PATENT DOCUMENTS

CN  1771733 A  5/2006
EP  1494353 A2  5/2005
(Continued)

OTHER PUBLICATIONS

Chinese Search Report for Application No. 201210156689.8 dated Dec. 19, 2014.
European Search Report, Appln. No. 12 003 914.4, dated Aug. 24, 2012.

Primary Examiner — Justin Shepard
(74) Attorney, Agent, or Firm — McAndrews, Held & Malloy, Ltd.

(57) ABSTRACT

A system and method in a broadband receiver (e.g., a satellite television receiver) for efficiently receiving and processing signals, substantially as shown in and/or described in connection with at least one of the figures, as set forth more completely in the claims.

17 Claims, 8 Drawing Sheets

(51) Int. Cl.
*H04N 21/434* (2011.01)
*H04N 21/643* (2011.01)
*H04N 21/647* (2011.01)
*H04N 21/6402* (2011.01)
*H04N 21/64* (2011.01)
*H04N 21/60* (2011.01)

(56) References Cited

FOREIGN PATENT DOCUMENTS

| | | |
|---|---|---|
| FR | 2854015 A1 | 10/2004 |
| JP | 3199137 B2 | 8/2001 |
| WO | 2009143082 A1 | 11/2009 |
| WO | 2011033342 A1 | 3/2011 |

SYSTEM AND METHOD IN A BROADBAND RECEIVER FOR EFFICIENTLY RECEIVING AND PROCESSING SIGNALS

CROSS-REFERENCE TO RELATED APPLICATIONS/INCORPORATION BY REFERENCE

This patent application is a continuation of U.S. application Ser. No. 13/326,125 filed Dec. 14, 2011 now U.S. Pat. No. 9,055,329 and is related to and claims priority from provisional patent application Ser. No. 61/487,979 filed May 19, 2011, and titled "EFFICIENT ARCHITECTURE FOR BROADBAND RECEIVERS," the contents of which are hereby incorporated herein by reference in their entirety. Each of the above identified documents is hereby incorporated herein by reference.

BACKGROUND OF THE INVENTION

Present broadband receivers, for example those utilized in satellite television systems, are unnecessarily complex and utilize bandwidth inefficiently. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method in a broadband receiver (e.g., a satellite television receiver) for efficiently receiving and processing signals, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF VARIOUS ASPECTS OF THE INVENTION

Figure 1:
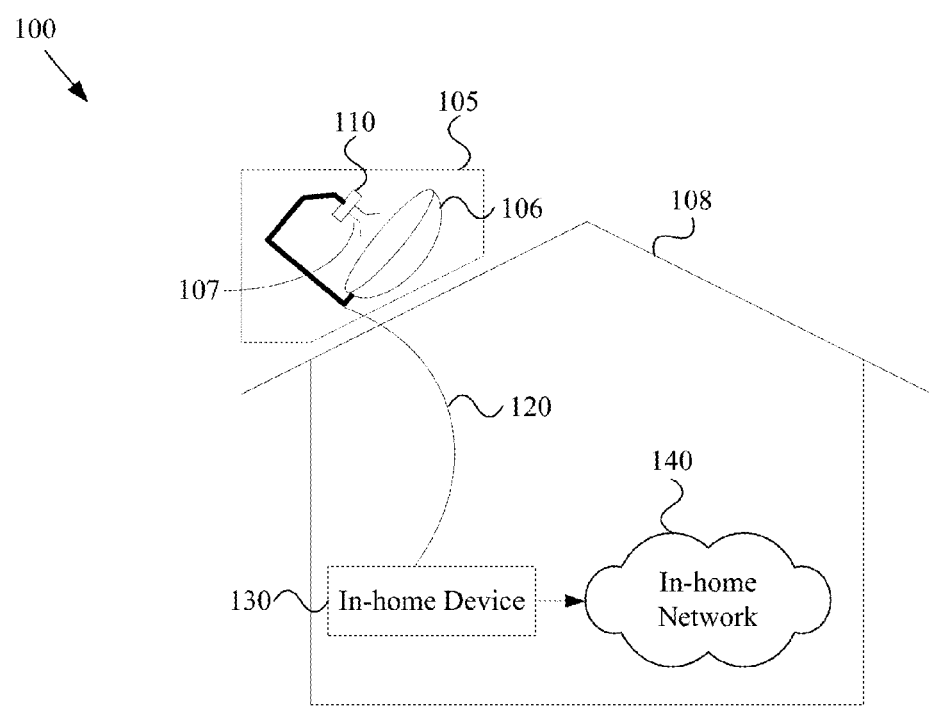
FIG. 1 is a diagram illustrating a satellite television system.

The following discussion will refer to various modules, components and/or circuits. Such modules, components and/or circuits may generally comprise hardware and/or a combination of hardware and software (e.g., including firmware). Such modules may also, for example, comprise a computer readable medium (e.g., a non-transitory medium) comprising instructions (e.g., software instructions) that, when executed by a processor, cause the processor to perform various functional aspects of the present invention. Accordingly, the scope of various aspects of the present invention should not be limited by characteristics of particular hardware and/or hardware/software implementations of a module, component or circuit unless explicitly claimed as such. For example and without limitation, various aspects of the present invention may be implemented by one or more processors (e.g., a microprocessor, digital signal processor, baseband processor, microcontroller, etc.) executing software instructions (e.g., stored in volatile and/or non-volatile memory). Also for example, various aspects of the present invention may be implemented by an application-specific integrated circuit ("ASIC") and/or other hardware components.

Additionally, the following discussion will refer to various functional modules (e.g., communication modules, signal processing modules, etc.). It should be noted that the following discussion of such various modules is segmented into such modules for the sake of illustrative clarity. However, in actual implementation, the boundaries between various modules may be blurred. For example, any or all of the functional modules discussed herein may share various hardware and/or software components. For example, any or all of the functional modules discussed herein may be implemented wholly or in-part by a shared processor executing software instructions. Additionally, various software sub-modules that may be executed by one or more processors may be shared between various software modules. Accordingly, the scope of various aspects of the present invention should not be limited by arbitrary boundaries between various hardware and/or software components, unless explicitly claimed.

The following discussion may also refer to communication networks and various aspects thereof. For the following discussion, a communication network is generally the communication infrastructure through which a device (e.g., a portable communication device, television, television control device, television provider, television programming provider, television receiver, video recording device, set top box, network controller, satellite dish circuitry, etc.) may communicate with other devices. For example and without limitation, a communication network may comprise a cable and/or satellite television communication network, a cellular communication network, a wireless metropolitan area network (WMAN), a wireless local area network (WLAN), a wireless personal area network (WPAN), any home or premises communication network (e.g., an in-home coaxial cable television communication network), etc. A particular communication network may, for example, generally have a corresponding communication protocol according to which a communication device may communicate with the communication network. Unless so claimed, the scope of various aspects of the present invention should not be limited by characteristics of a particular type of communication network.

Turning first to FIG. 1, such figure is a diagram illustrating a satellite television system 100. The exemplary system 100 comprises a premises 108 (e.g., a home, building, office, etc.). External to the premises 108 is a satellite dish system 105, comprising a satellite dish 106, feed horn 107, and low noise block downconverter (LNB) 110, which will be discussed in more detail below. The satellite dish system 105 outputs one or more IF analog signals and communicates such signals into the premises 108 over one or more cables 120 (e.g., coaxial cables) to an in-home device 130 (e.g., a satellite set top box, an in-home multiswitch, etc.). The in-home device 130 may be connected to an in-home communication network 140.

Figure 2:
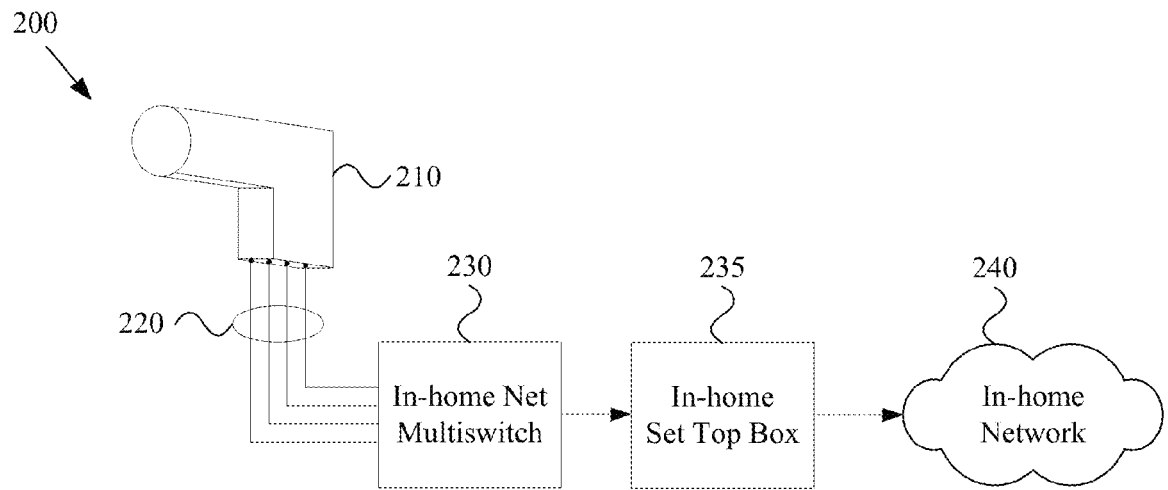
FIG. 2 is a diagram illustrating a satellite television system.

Turning next to FIG. 2, such figure is a diagram illustrating an exemplary satellite television system 200. The exemplary system 200 may, for example, comprise a low noise block downconverter (LNB) 210 (e.g., as illustrated at item 110 in FIG. 1), which generally operates to amplify a received RF satellite signal and convert such signal to lower frequencies (e.g., intermediate frequencies (or IF)). The LNB 210 is typically collocated with a satellite dish at a satellite dish system (e.g., as illustrated at the satellite dish system 105 of FIG. 1). For example, the LNB 210 may be mounted to the satellite dish, share a same general structure with the satellite dish, etc.

Such a system 200 may, for example, be implemented in a manner that receives a plurality of bands. Such implementation may, for example, arise when a satellite dish is receiving signals from multiple orbital slots. In such a configuration, the LNB 210 may output a plurality of IF signals over a plurality of respective cables 220 (e.g., coaxial cables). Each of such a plurality of IF signals may, for example, cover a broadband frequency range (e.g., from 950 MHz to 2150 MHz).

Such a plurality of cables 220 may, for example, terminate (e.g., in the home or other customer premises (CP)) at a network multi-switch 230. The multi-switch 230 may, for example, reside in the customer premises (e.g., in a customer home). Such a multi-switch 230 (e.g., individually and/or combined with a receiver) is an example of the in-home device 130 of FIG. 1. The multi-switch 230 may, for example, direct particular IF signals to one or more respective receivers. For illustrative clarity, the system 200 is only shown with a single in-home set top box (STB) 235 receiving a signal from the multi-switch 230. The in-home set top box 235 may then select channels from the IF signal(s), where such channels have for example been specified by the provider (and/or customer), and combine such selected channels in an output for communication on a home network 240.

The exemplary system 200 of FIG. 2 suffers from having a plurality of cables 220 coupling the LNB 210, which is generally outside a premises (e.g., outside a customer home) with satellite receiver circuitry located inside a premises.

Figure 3:
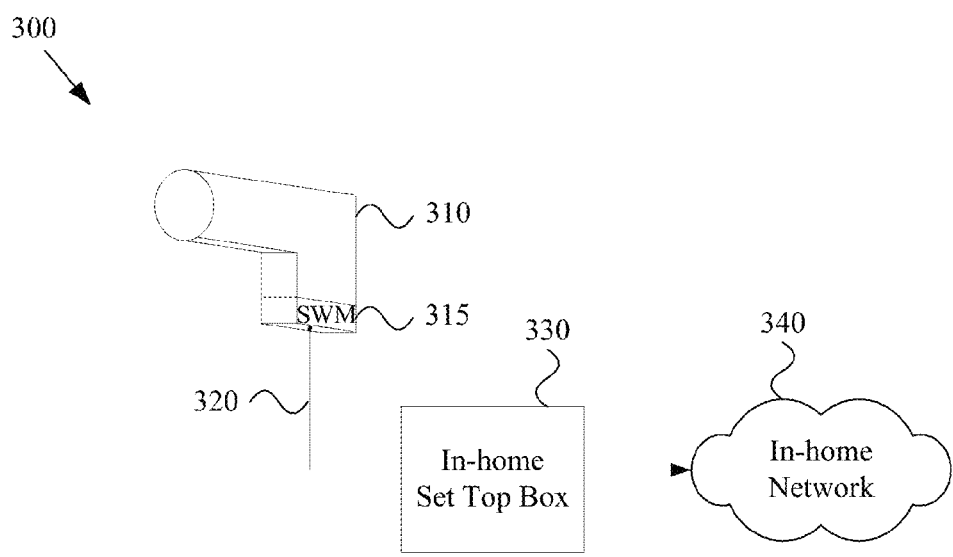
FIG. 3 is a diagram illustrating a satellite television system.

Turning next to FIG. 3, such figure is a diagram illustrating a satellite television system 300. The exemplary system 300 may, for example, comprise a low noise block downconverter (LNB) 310 (e.g., as illustrated at item 110 in FIG. 1), which generally operates to amplify a received RF satellite signal and convert such signal to lower frequencies (e.g., intermediate frequencies (or IF)). The LNB 310 is typically collocated with a satellite dish at a satellite dish system (e.g., as illustrated at the satellite dish system 105 of FIG. 1).

Such a system 300 may, for example, be implemented in a manner that receives a plurality of bands. Such implementation may, for example, arise when a satellite dish is receiving signals from multiple orbital slots. In such a configuration, the LNB 310 may output a plurality of IF signals. In comparison with the system 200 illustrated in FIG. 2, which communicates the plurality of IF signals over a plurality of respective cables 220, the system 300 of FIG. 3 comprises a single wire module (SWM) 315, communicatively coupled to the LNB 310, that processes the plurality of IF signals from the LNB 310 (e.g., frequency shifting or "channel-stacking" such IF signals) to combine the IF signals (e.g., selected portions thereof) onto a single cable (e.g., a coaxial cable). Such SWM 315 may, for example, comprise a channel stacking switch to perform such functionality. In such a configuration, the SWM 315 may output the stacked IF signals over a cable 320 (e.g., a coaxial cable).

Such a cable 320 may, for example, terminate (e.g., in the home or other customer premises (CP)) at a set top box (STB) 330. The STB 330 may, for example, reside in the customer premises (e.g., in a customer home). Such a set top box 330 is an example of the in-home device 130 of FIG. 1. The STB 330 may then, for example, communicate selected channels over a home network 340 to various other devices (e.g., television devices, media content storage devices, personal computing devices, etc.).

Though the exemplary system 300 of FIG. 3 eliminates the multiple IF cables of the system 200 of FIG. 2, such system 300 suffers from having the SWM 315, which is a relatively expensive component that consumes a relatively large amount of power.

Figure 4:
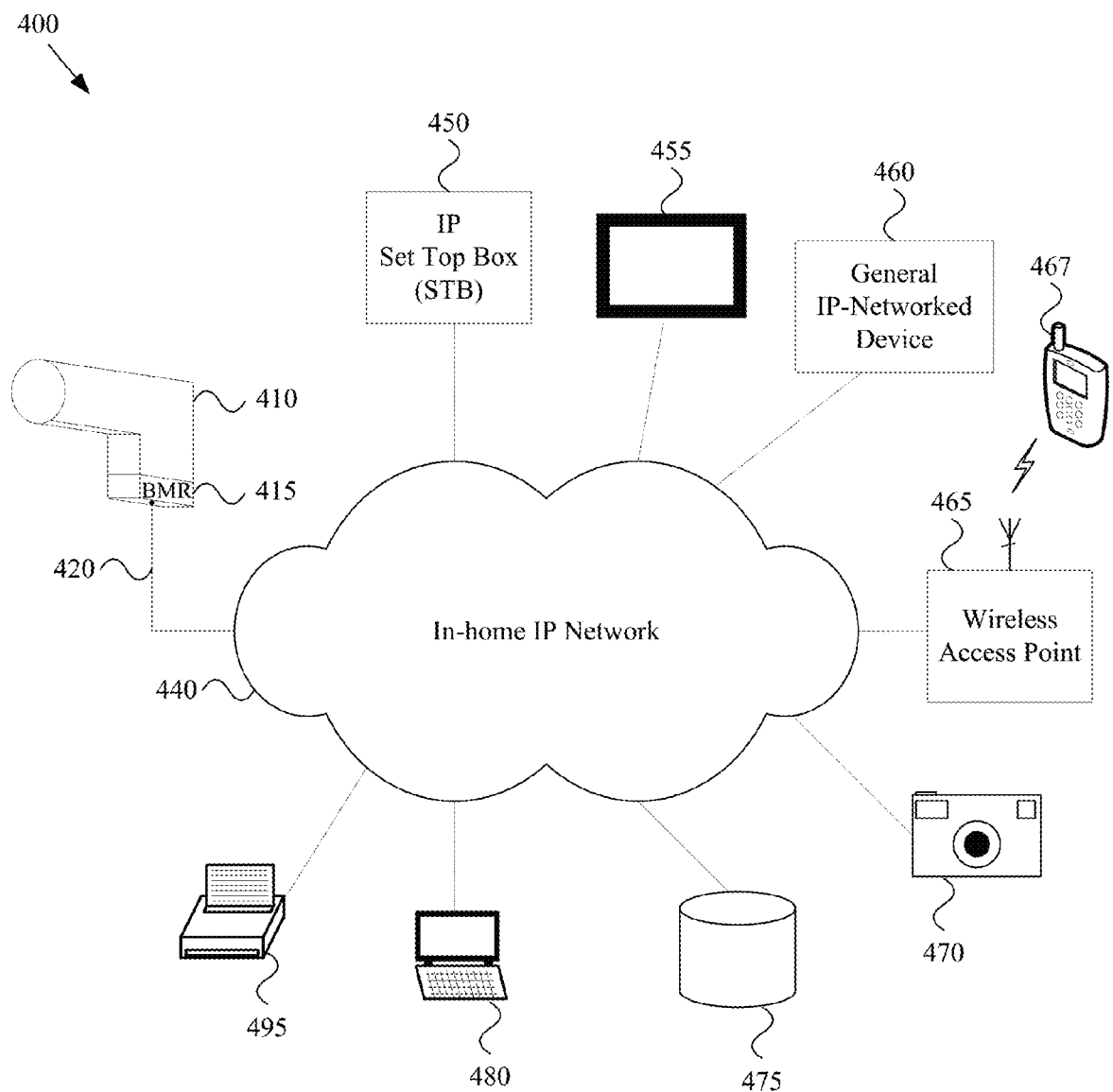
FIG. 4 is a diagram illustrating an exemplary communication system, in accordance with various aspects of the present invention.

Turning next to FIG. 4, such figure is a diagram illustrating a satellite television system 400. The exemplary system 400 may, for example, comprise a low noise block downconverter (LNB) 410, which generally operates to amplify a received RF satellite signal and convert such signal to lower frequencies (e.g., intermediate frequencies (or IF)). The LNB 410 is typically collocated with a satellite dish at a satellite dish system (e.g., as illustrated at the satellite dish system 105 of FIG. 1).

Such a system 400 may, for example, be implemented in a manner that receives a plurality of bands. Such implementation may, for example, arise when a satellite dish is receiving signals from multiple orbital slots. In such a configuration, the LNB 410 may generate and/or output a plurality of IF signals. In comparison with the system 200 illustrated in FIG. 2 which communicates the plurality of IF signals over a plurality of respective cables 220, the system 400 of FIG. 4 comprises a broadband multichannel receiver (BMR) 415 that processes the plurality of IF signals received from the LNB 410 and outputs a digital signal (e.g., a digital Internet Protocol (IP) signal) that communicates selected channels (e.g., over a single cable 420, over multiple cables 420 numbering less than the number of IF signals from the LNB 410, etc.). The discussion of FIG. 5 below, and subsequent figures, will include detailed discussion of the BMR 415 (which, when combined with the LNB 410, may also be referred to herein as an IP-LNB 410/415). The BMR 415 may, for example, be housed with the LNB 410 in a same housing, implemented on a same circuit board as the LNB 410, implemented on a same semiconductor substrate as the LNB 410, implementing on a system-on-a-chip (SoC) with the LNB 410, etc. Additionally, in comparison with the system 300 illustrated in FIG. 3, which utilizes a relatively expensive and power-hungry SWM 315, the exemplary system 400 of FIG. 4 replaces such SWM 315 with a relatively low-cost and energy efficient BMR 415.

As mentioned above, the BMR 415 may output a digital IP signal. The exemplary system 400 comprises a cable 420 (e.g., a coaxial cable) over which the digital IP signal output from the BMR 415 is communicated to an in-home IP network 440 (or in-premises IP network). Such an in-home IP network 440 may comprise various characteristics, non-limiting examples of which will now be presented. The network 440 may, for example, be a cable-based (e.g., a television coaxial cable-based) network. Such an implementation may, for example, utilize an existing in-home cable television network for the communication of IP signals. For example, such a cable-based network 440 may be operated in accordance with a Multimedia over Coax Alliance (MoCA) protocol (e.g., MoCA 1.0, MoCA 1.1, MoCA 2.0, etc.). Also for example, such a cable-based network 440 may be operated in accordance with an ITU G.hn standard (or portion thereof), a HomePNA standard (or portion thereof), etc. In an additional example, the network 440 may be operated in accordance with an Ethernet standard (e.g., gigabit Ethernet), a wireless standard (e.g., 802.11abgn, 802.11ac, etc.), etc. Note that in various implementations, the BMR 415 may communicate with such In-home IP Network 440 via a wireless link.

The in-home IP network 440 may, for example, communicatively couple any of a variety of devices, each of which may in turn be communicatively coupled to the IP-LNB 410/415. Such devices may, for example, reside in the user's home.

By way of example and not limitation, the system 400 may comprise an IP set top box (IP-STB) 450 that resides in the home and is communicatively coupled to the in-home IP network 440. Such an IP-STB 450 may, for example, communicate directly with the IP-LNB 410/415 (or the BMR 415) outside the home. Also for example, the system 400 may comprise a television 455 (e.g., an IP-capable television) that resides in the home and is communicatively coupled to the in-home IP network 440. Such a television 455 may, for example, communicate directly with the IP-LNB 410/415 (or the BMR 415) outside the home.

Additionally for example, the system 400 may comprise a networked attached storage (NAS) 475 that resides in the home and is communicatively coupled to the in-home IP network 440. Such a NAS 475 may, for example, communicate directly with the IP-LNB 410/415 (or the BMR 415) outside the home. Note that in various implementations, such a NAS 475 (or another NAS) may reside off-premises (e.g., at a location remote from the home), and in such case be communicatively coupled to the IP-LNB 410/415 (or the BMR 415) via the in-home network 440 and one or more other communication networks (e.g., the Internet).

Also for example, the system 400 may comprise a personal computer 480 that is located in the home and is communicatively coupled to the in-home IP network 440 (e.g., directly, via cable modem, via wireless modem, etc.). Such personal computer 480 may, for example, communicate directly with the IP-LNB 410/415 (or the BMR 415) outside the home. Additionally for example, the system 400 may comprise a printer 495 (or other computer peripheral device) that resides in the home and is communicatively coupled to the in-home IP network 440. Such a printer 495 may, for example, communicate directly with the IP-LNB 410/415 (or the BMR 415) outside the home (e.g., for the communication of printable information and/or scanned information that may be communicated via satellite, like program guide information, advertisement information, etc.).

Further for example, the system 400 may comprise a wireless access point 465 (e.g., a wireless router, for example an access point operating in accordance with, for example, any of the 802.11 standards, the Bluetooth standard, a WiMAX standard, a cellular standard, etc.) that is located in the home and is communicatively coupled to the in-home IP network 440 (e.g., directly, via cable modem, etc.). Such wireless access point 465 may, for example, communicate directly with the IP-LNB 410/415 (or the BMR 415) outside the home. For example, such wireless access point 465 may operate to provide a wireless communication link between the in-home network 440 and a wireless device 467 (e.g., a mobile phone, mobile computing device, wireless game controller, personal digital assistant, smart phone, etc.).

Also for example, the system 400 may comprise a camera 470 (e.g., a still and/or moving image camera) that resides in the home and is communicatively coupled to the in-home IP network 440. Such a camera 470 may, for example, communicate directly with the IP-LNB 410/415 (or the BMR 415) outside the home (e.g., for the communication of still and/or moving image information that may be communicated via satellite).

Still further for example, the system 400 may comprise any general IP-Networked Device 460 (e.g., an IP-enabled gaming device, a climate control system, a home security system, or any other IP-enabled device). Such IP-Networked Device may, for example, operate to communicate information with the IP-LNB 410/415 (or the BMR 415) via the in-home IP network 440.

The exemplary system 400 is presented to provide non-limiting exemplary characteristics of an in-home network comprising an IP-LNB 410/415 in accordance with various aspects of the present invention. Accordingly, the scope of various aspects of the present invention should not be limited by any of such exemplary characteristics unless explicitly claimed.

Figure 5:
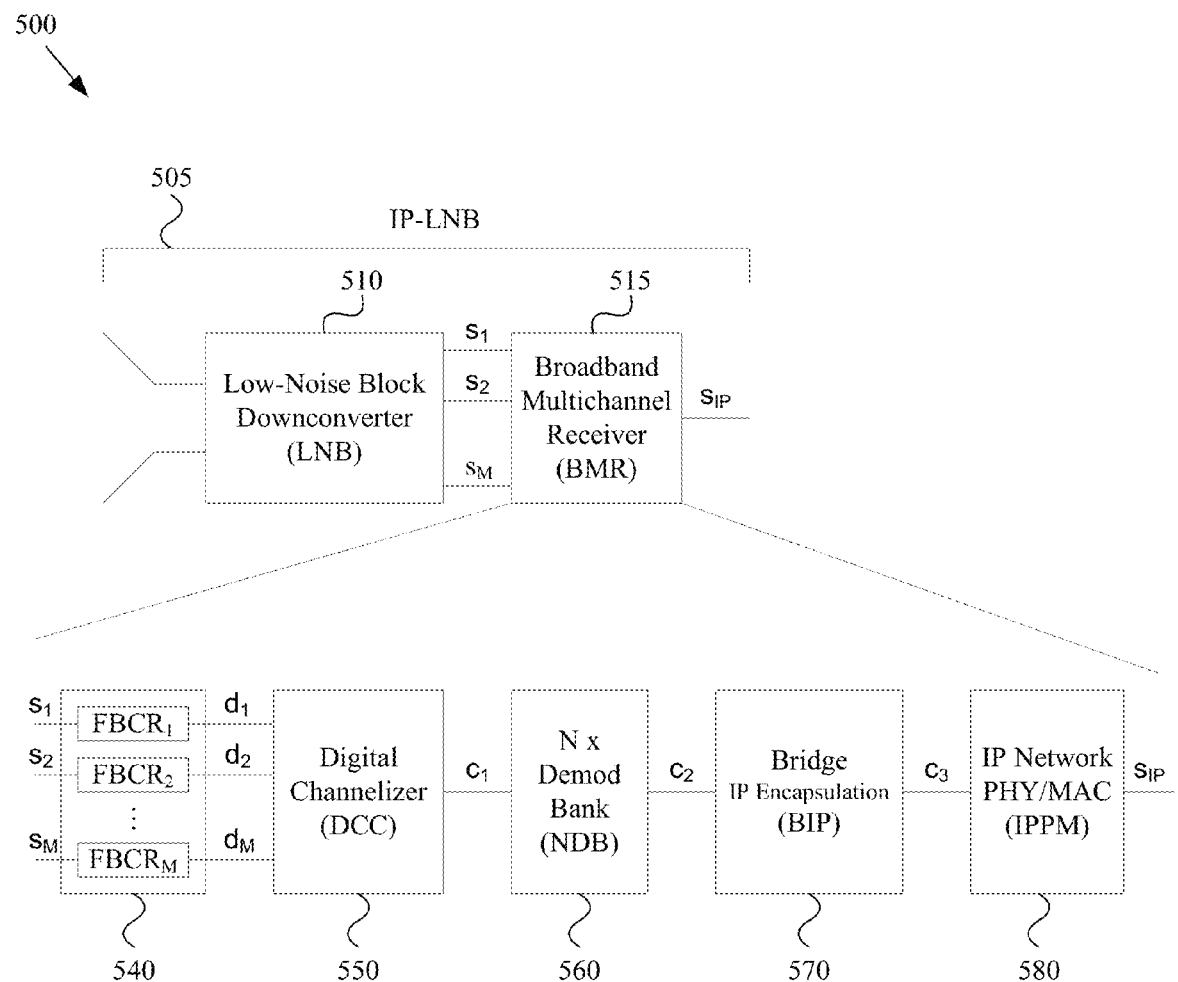
FIG. 5 is a diagram illustrating an exemplary communication system comprising a broadband receiver system, in accordance with various aspects of the present invention.

Turning next to FIG. 5, such figure is a diagram illustrating an exemplary communication system 500 comprising a broadband receiver system, in accordance with various aspects of the present invention. Such system 500 may, for example and without limitation, share any or all aspects with the IP-LNB 410/415 discussed previously with regard to the exemplary system 400 illustrated in FIG. 4.

The exemplary communication system 500 comprises an LNB 510. As discussed previously, such an LNB 510 generally receives RF satellite signals at a satellite dish, and filters and amplifies such signals to generate corresponding IF signals, which are then provided to downstream entities. The LNB 510 may, for example and without limitation, share any and all aspects with the LNBs 110, 210, 310 and 410 illustrated in FIGS. 1-4 and discussed previously. The LNB 510 is illustrated outputting M (an integer number) of IF signals, labeled $s_1$ to $s_M$. Each of such IF signals may, for example, comprise IF signals in the 950 MHz to 2150 MHz range, each of which corresponding to a respective satellite signal (e.g., a satellite television signal).

The exemplary system 500 also comprises a broadband multichannel receiver (BMR) 515. Such BMR 515 may, for example and without limitation, share any or all aspects with the BMR 415 discussed previously with regard to the exemplary system 400 illustrated in FIG. 4. Such BMR 515 may, for example, be operable to (e.g., including operate to and/or operate when enabled to) process the plurality of IF signals $s_1$-$s_M$ received from the LNB 510 and output a digital signal (e.g., one or more digital Internet Protocol (IP) signals) that communicates desired channels. For example, a non-limiting exemplary implementation of the BMR 515 is illustrated in FIG. 5, and comprises a variety of modules, for example a Full-Band Capture Receiver bank 540, Digital Channelizer 550, N×Demodulator bank 560, IP Bridge 570, and Communication Interface Module 580 (e.g., an IP communication interface module comprising a MAC and PHY layer for IP networking). Such modules may, for example, be implemented in hardware or a combination of hardware and software.

For example, the BMR 515 may comprise a Full-Band Capture Receiver bank 540 (e.g., comprising M full-band capture receivers, $FBCR_1$-$FBCR_M$. Each of such full-band capture receivers may, for example, digitize the entire IF signal contained on a respective input IF signal from the LNB 510. In an exemplary satellite implementation, each of such full-band capture receivers may, for example, digitize the entire 950 MHz to 2150 MHz range of satellite-related content (e.g., media content) on the respective input signal. For example, $FBCR_1$ may receive analog IF signal $s_1$ from the LNB 510 and digitize the entire IF content of the input signal $s_1$ to generate output signal $d_1$. In such a manner, the full-band capture receiver bank 540 may receive M analog IF signals $s_1$-$s_M$ from the LNB 510 and output corresponding digital signals $d_1$-$d_M$. Non-limiting examples of full-band capture receivers will be presented below in FIGS. 6-7 and the respective discussions thereof.

Note that although the full-band capture receiver bank 540 is shown and discussed as receiving the M analog IF signals $s_1$-$s_M$ from the LNB 510, such signals may be received from a plurality of different sources (e.g., from one or more satellite television sources, from one or more cable television sources, from one or more terrestrial broadcast television sources, etc.). Such full-band capture receiver(s) may, for example, operate to capture the complete, or substantially complete, spectral band for a particular communication protocol, standard or proprietary (e.g., for a satellite television communication protocol). Also, such full-band capture receiver(s) may, for example, operate to capture the complete, or substantially complete, respective spectral bands for a plurality of respective communication protocols, standard or proprietary (e.g., for a satellite television communication protocol and/or a cable television communication protocol and/or a terrestrial television communication protocol, etc.).

Note that, depending on the IF bandwidth utilization and/or depending on desired channels, one or more of the plurality of FBCRs of the FBCR bank 540 may be powered down. For example, if a particular FBCR corresponds to a satellite signal that is not presently providing a desired channel, such particular FBCR may be powered down (e.g., until a need for a channel corresponding to the particular FBCR arises). Alternatively, a non-utilized FBCR may also be re-tasked to process another signal (e.g., a signal corresponding to another orbital slot, a signal corresponding to a different signal source, for example, a different satellite and/or terrestrial broadcast source, etc.). Additionally, an FBCR may also reduce its capture bandwidth if the desired channels fall within a limited portion of the full band.

Note that the FBCR bank 540 is an exemplary implementation. The implementation of block 540 may alternatively comprise multiple single-channel tuners, followed by an analog to digital converter.

The BMR 515 may also comprise a Digital Channelizer (DCC) 550. The DCC 550 may, for example, operate to receive the digitized signals $d_1$-$d_M$ output from the FBCR bank 540. The DCC 550 may then, for example, process such received digitized signals $d_1$-$d_M$ (e.g., decimating and filtering such signals) to select desired channels from the set of channels available in the digitized signals $d_1$-$d_M$. As such, the DCC 550 may, for example, serve as a crossbar for selecting an arbitrary set of desired channels from among the channels available from one or more broadband sources.

Figure 8:
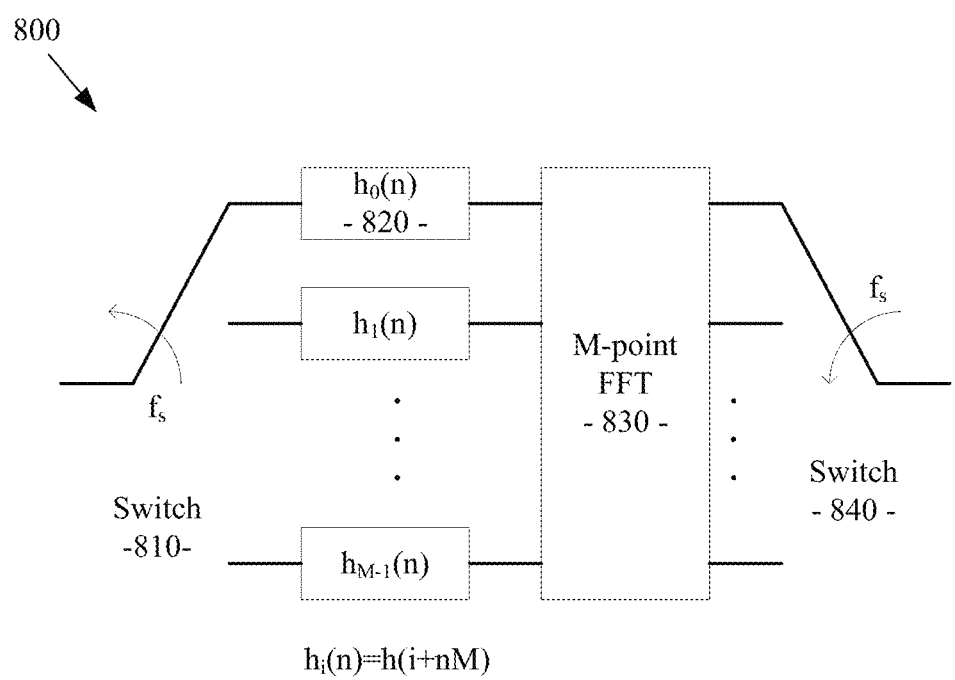
FIG. 8 is a diagram illustrating an exemplary polyphase channelizer, in accordance with various aspects of the present invention.

The DCC 550 may perform such processing in any of a variety of manners. For example and without limitation, the DCC 550 may utilize a polyphase filter or a block that calculates a running FFT of the received digitized signals $d_1$-$d_M$ and selects a decimated output from each FFT for further processing. The DCC 550 may, for example, perform switching and routing operations after performing the above-mentioned FFT/filtering operations, which may, for example, beneficially reduce the speed at which the switching and routing operations need be performed. A non-limiting example of a polyphase channelizer circuit is shown in FIG. 8.

The further processed output may then, for example, be output on one or more output lines $c_1$ (e.g., output on M output lines, each of which corresponding to one of the M input signals; multiplexed onto a single output line; multiplexed onto more than one and less than M output lines, etc.).

The DCC 550 may, for example, receive channel-selection information from upstream (e.g., via a path from the satellite) and/or from downstream (e.g., from an in-home device), such channel-selection information being indicative of such desired channels. For example, the channel selection process may be controlled by the operator, by the customer, by both the operator and the customer, etc.

The BMR 515 may additionally comprise an N×Demodulator bank (NDB) 560. Such NDB 560 may, for example, operate to receive the output signal(s) $c_1$ from the DCC 550 and recover the digital information modulated on such received signal(s). The output $c_1$ of the DCC 550 (which may comprise one or more digital signals output on one or more output lines) may, for example, comprise one or more transport streams, including for example, media transport streams like MPEG, general data transport streams, etc.

The BMR 515 may further comprise an IP Bridge (BIP) 570 (or other protocol bridge(s)). Such BIP 570 may, for example, operate to receive the output signal(s) $c_2$ from the NDB 560 (e.g., including transport streams and/or other information) and encapsulate such digital information in IP packets. Such encapsulation may, for example, comprise forming the input digital information into IP packets for downstream communication.

The BIP 570 may also, for example, operate to filter the digital information received from the NDB 560. Such filtering may, for example, comprise various types of data filtering. For example, the BIP 570 may operate to perform packet identification (PID) filtering to select only desired portions of the input data for encapsulation. Such filtering may, for example, beneficially reduce the amount of IP-encapsulated data that is sent downstream from the IP-LNB 505 to the customer premises (e.g., only desired packets are communicated on the in-home IP network). Such filtering may, for example, be controlled by the operator (via control signal(s) received via a satellite channel) and/or by the user (via control signal(s) received from in-home user apparatus).

The BIP 570 may then output the IP-encapsulated data on one or more output signals $c_3$. The BMR 515 may also comprise a communication interface module 580. Such a communication interface module 580 may operate to interface with a communication network (e.g., an in-home communication network). The previous discussion of FIG. 4 presented many non-limiting examples of such an in-home communication. For example and without limitation, the communication interface module 580 may comprise a module that interfaces with an IP network (e.g., operating to perform network layer operation, transport layer operation, MAC layer operation, and/or PHY layer operation compatible with the desired network). In such example, the communication interface module 580 may operate to interface with the IP network by transmitting and/or receiving signals $s_{IP}$ compatible with the IP network.

For example, as discussed above with regard to FIG. 4, the IP-LNB 410/415 (and, for example, the IP-LNB 505 of FIG. 5) may operate to communicate with an in-home communication network. Such an in-home communication network 440 may comprise various characteristics, non-limiting examples of which will now be presented. The network 440 may, for example, be a cable-based (e.g., a television coaxial cable-based) network. Such an implementation may, for example, utilize an existing in-home cable television network for the communication of IP signals. For example, such a cable-based network 440 may be operated in accordance with a Multimedia over Cable Alliance (MoCA) protocol (e.g., MoCA 1.0, MoCA 1.1, MoCA 2.0, etc.). Also for example, such a cable-based network 440 may be operated in accordance with an ITU G.hn standard (or a portion thereof), a HomePNA standard (or a portion thereof), etc. In an additional example, the network 440 may be operated in accordance with an Ethernet standard (e.g., gigabit Ethernet), a wireless standard (e.g., 802.11abgn, 802.11ac, etc.), etc. The network 440 may also, for example, operate in accordance with a protocol that includes aspects of a point-to-point communication protocol, a mesh communication protocol, a tree-structure communication protocol, etc. The communication interface module 515 of the BMR 515 will, for example, operate in the manner appropriate for conducting communication in accordance with the appropriate network architecture and/or protocol.

Note that although the communication interface module 580 is shown and discussed interfacing with a single communication network (e.g., a single in-home IP network), the communication interface module 580 may operate to communicate with a plurality of different types of communication networks (e.g., simultaneously, pseudo-simultaneously in a timeshare manner, one at a time, etc.). Many examples of such different types of networks were presented above.

The exemplary system 500 is presented to provide non-limiting exemplary characteristics of an IP-LNB 505 in accordance with various aspects of the present invention. Accordingly, the scope of various aspects of the present invention should not be limited by any of such exemplary characteristics unless explicitly claimed. For example, the previous discussion of the exemplary communication system 500 focuses on a satellite dish system IP-LNB utilization of the exemplary communication system 500. The previously-discussed aspects also generally apply to non-satellite communication systems, and accordingly, the scope of various aspects of the present invention should not be limited by characteristics of satellite communication systems unless explicitly claimed.

Figure 6:
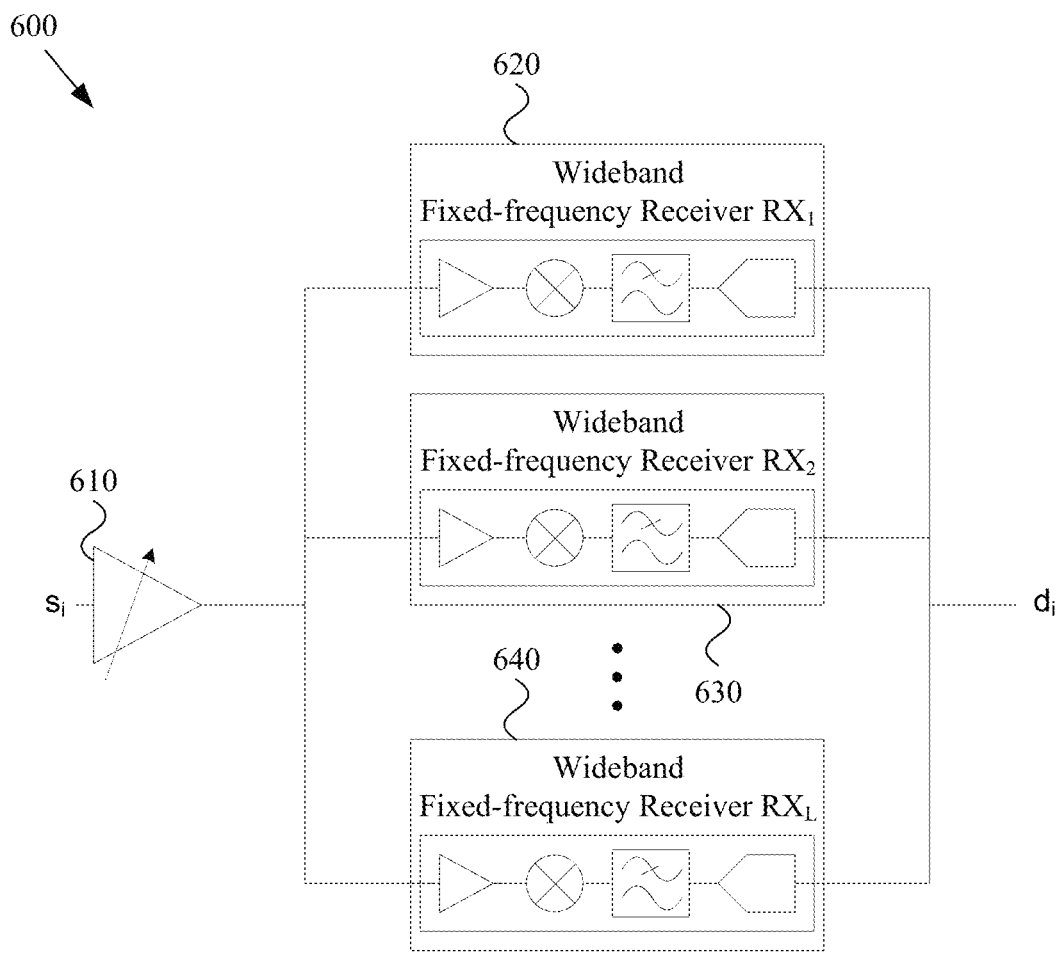
FIG. 6 is a diagram illustrating an exemplary full-band capture receiver, in accordance with various aspects of the present invention.

As discussed above, FIGS. 6 and 7 provide non-limiting examples of the full-band capture receivers $FBCR_1$-$FBCR_M$ discussed above. Turning to FIG. 6, such figure is a diagram illustrating an exemplary full-band capture receiver (FBCR) 600, in accordance with various aspects of the present invention.

The exemplary FBCR 600, for example, comprises a variable gain amplifier 610 that receives an IF signal $s_i$ (e.g., from an LNB). The output of the variable gain amplifier 610 is then provided to a plurality of wideband fixed-frequency receivers $RX_1$-$RX_L$, each of which is tuned to receive signals in a respective portion of the full-band of the input IF signal $s_i$. The digitized outputs of such receivers $RX_1$-$RX_L$ are then combined to yield a digital output $d_i$. For example, a first wideband fixed-frequency receiver $RX_1$ 620 may comprise an amplifier, mixer, filter and analog-to-digital filter, which are used to process the input IF signal $s_i$ in a first portion of the IF frequency band. Similarly, a second wideband fixed-frequency receiver $RX_2$ 630 may comprise an amplifier, mixer, filter and analog-to-digital filter, which are used to process the input IF signal $s_i$ in a second portion of the IF frequency band. Similarly, an $L^{th}$ wideband fixed-frequency receiver $RX_L$ 640 may comprise an amplifier, mixer, filter and analog-to-digital filter, which are used to process the input IF signal $s_i$ in an $L^{th}$ portion of the IF frequency band. Various aspects of an exemplary FBCR 600 are presented in U.S. Provisional Patent Application No. 61/427,088, filed Dec. 23, 2010, and titled "METHOD AND APPARATUS FOR BROADBAND DATA CONVERSION", which is hereby incorporated herein by reference in its entirety.

Figure 7:
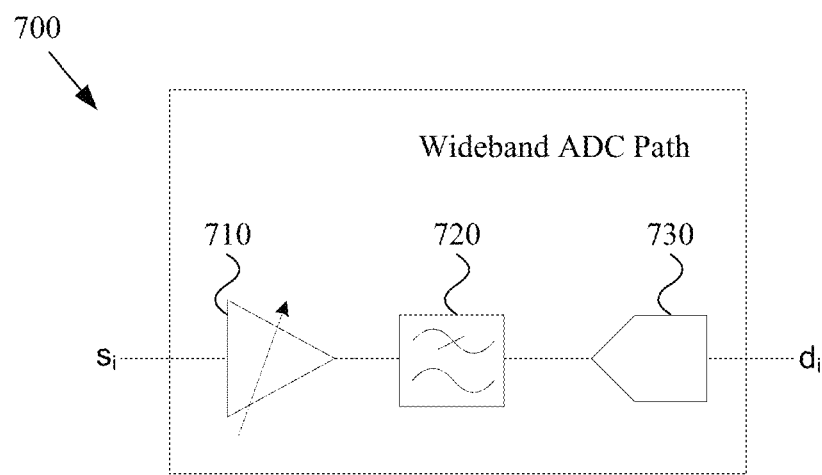
FIG. 7 is a diagram illustrating an exemplary full-band capture receiver, in accordance with various aspects of the present invention.

FIG. 7 is a diagram illustrating an exemplary full-band capture receiver (FBCR) 700, in accordance with various aspects of the present invention. The exemplary FBCR 700, for example, comprises a variable gain amplifier 710 that receives an IF signal $s_i$ (e.g., from an LNB). The output of the variable gain amplifier 710 is then provided to a filter 720, which may, for example, be utilized for anti-aliasing and equalization. The filter 720 outputs a filtered signal, which is then received by a wideband analog-to-digital converter 730, which in turn is capable of digitizing the filtered IF signal over the entire relevant bandwidth. The A/D converter 730 then outputs a digital output $d_i$.

Turning next to FIG. 8, as discussed above, FIG. 8 provides a non-limiting example of a digital polyphase channelizer (DCC) 800. Such a digital polyphase channelizer 800 may, for example, be utilized in the DCC 550 of FIG. 5 to perform the channelization operation.

The exemplary a polyphase channelizer 800 may, for example, comprise a plurality of filters 820 ($h_o$-$h_{M-1}$) serving as a polyphase partition, the inputs to which are controlled by a switching device 810. The outputs of the filters 820 are input to an M-point FFT engine 830, where the outputs of the FFT engine 830 are then selected by switch 840 for output. Such switch 840 may, for example operate to multiplex the outputs from the FFT engine 830 on a single output line.

Figure 9:
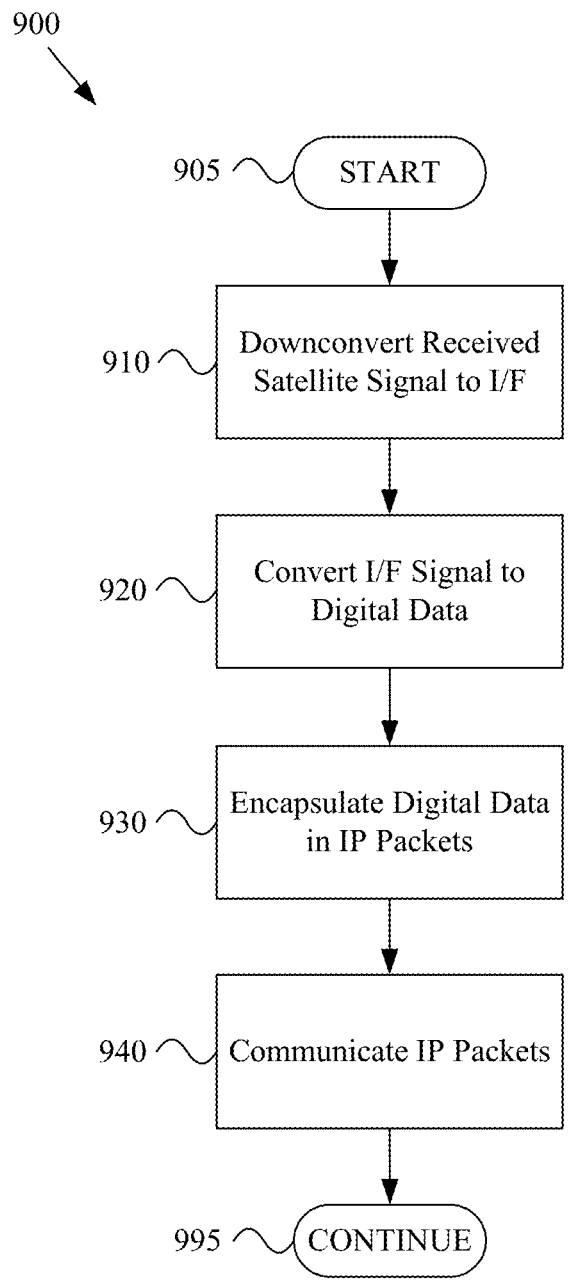
FIG. 9 is a flow diagram illustrating an exemplary method for receiving a broadband signal, in accordance with various aspects of the present invention.

Turning next to FIG. 9, such figure is a flow diagram illustrating an exemplary method 900 for receiving a broadband signal, in accordance with various aspects of the present invention. The exemplary method 900 may share any or all functional aspects with the systems illustrated in FIGS. 1-8 and discussed previously.

The exemplary method 900 (e.g., the entire method 900 and/or any portion thereof) may be performed by one or more components of a satellite dish system (e.g., by components generally collocated with a satellite dish, for example outside the home). As a non-limiting example, any or all functional aspects of the exemplary method 900 may be performed by a broadband multichannel receiver (BMR) that may for example be communicatively coupled to an upstream LNB and a downstream premises-based IP network (e.g., an in-home cable network).

The exemplary method 900 starts execution at step 905. The exemplary method 900 may begin executing in response to any of a variety of causes and/or conditions. For example and without limitation, the method 900 may begin executing in response to resetting and/or powering up a satellite dish system (e.g., circuitry generally collocated with a satellite dish). Also for example, the method 900 may begin executing in response to a signal received from an external device (e.g., an in-home consumer electronic device) indicating that the one or more channels are desired. Further for example, the method 900 may begin executing in response to a signal received from an external device indicating a change in a desired set of channels (e.g., for in-home consumption of media and/or general data associated with such channels). In general, the exemplary method 900 may begin executing at step 905. Accordingly, the scope of various aspects of the present invention should not be limited by characteristics of any particular initiating cause and/or condition unless explicitly claimed.

The exemplary method 900 may, at step 910, comprise downconverting one or more received satellite signals (and/or signal received from other sources, like cable sources, terrestrial television broadcast signal, etc.). Step 910 may, for example and without limitation, share any or all downconverting characteristics discussed previously (e.g., with regard to various LNBs 110, 210, 310, 410, and 510 discussed herein). For example, step 910 may comprise receiving one or more RF satellite signals at a satellite dish, amplifying such received signals, and converting such signals to one or more IF signals. Note that the received and converted signals need not necessarily be RF satellite signals. In general, step 910 may comprise downconverting one or more received signals. Accordingly, the scope of various aspects of the present invention should not be limited by characteristics of any particular downconversion functionality unless explicitly claimed.

The exemplary method 900 may, at step 920, comprise converting one or more IF signals (e.g., IF satellite signals) to digital data. Step 920 may, for example and without limitation, share any or all functional aspects with various components of the broadband multichannel receiver (BMR) 515 illustrated in FIG. 5 and discussed previously (e.g., Full-Band Capture Receiver bank 540, Digital Channelizer 550, and N×Demodulator bank 560). For example and without limitation, step 920 may comprise processing a plurality of IF signals (e.g., resulting from step 910) and output a digital signal (e.g., one or more digital Internet Protocol (IP) signals) that communicates desired channels. In general, step 920 may comprise converting one or more IF signals to digital data. Accordingly, the scope of various aspects of the present invention should not be limited by characteristics of any particular type of signal conversion and/or any particular manner of performing such signal conversion unless explicitly claimed.

The exemplary method 900 may, at step 930, comprise encapsulating digital data in protocol packets (e.g., IP packets). Step 930 may, for example and without limitation, share any or all functional aspects with various components of the broadband multichannel receiver (BMR) 515 illustrated in FIG. 5 and discussed previously (e.g., BIP 570). For example and without limitation, step 930 may comprise receiving one or more digital signals communicating digital data (e.g., resulting from step 920), encapsulating such received data in protocol packets (e.g., IP packets) and outputting one or more digital signals communicating such protocol packets. In general, step 930 may comprise encapsulating digital data in protocol packets. Accordingly, the scope of various aspects of the present invention should not be limited by characteristics of any particular type of packet and/or any particular manner of forming received data into such packets unless explicitly claimed.

The exemplary method 900 may, at step 940, comprise communicating protocol packets (e.g., IP packets). Step 940 may, for example and without limitation, share any or all functional aspects with various components of the broadband multichannel receiver (BMR) 515 illustrated in FIG. 5 and discussed previously (e.g., communication interface module 580). For example and without limitation, step 940 may comprise receiving one or more digital signals communicating protocol-encapsulated data (e.g., IP-encapsulated data and/or other protocol-encapsulated data resulting from step 930) and communicating such packets over a communication network. Many non-limiting examples of such networks (e.g., in-home cable networks, premises-based wired and/or wireless networks, etc.) are presented above. In general, step 940 may comprise communicating protocol packets. Accordingly, the scope of various aspects of the present invention should not be limited by characteristics of any particular type of packet and/or any particular manner of communicating such packets unless explicitly claimed.

In summary, various aspects of the present invention provide a system and method in a broadband receiver (e.g., a satellite television receiver) for efficiently receiving and processing signals. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A satellite dish system for receiving satellite signals, said satellite dish system comprising:
at least one module comprising a first full-band capture receiver and a second full-band capture receiver communicatively coupled to a low noise block downconverter (LNB) wherein:
said first full-band capture receiver is operable to, at least:
receive a first signal from said LNB; and
digitize the received first signal over all frequencies of the first signal that are used for carrying satellite television signal, the digitization resulting in a first digitized signal; and
said second full-band capture receiver is operable to, at least:
receive a second signal from said LNB; and
digitize the received second signal over all frequencies of the second signal that are used for carrying satellite television signal, the digitization resulting in a second digitized signal.

2. The satellite dish system of claim 1, wherein said at least one module comprises a digital channelizer communicatively coupled to said first full-band capture receiver and said second full-band capture receiver and operable to, at least:
receive said first digitized signal from said first full-band capture receiver, the received first digitized signal comprising a first plurality of channels;
receive said second digitized signal from said second full-band capture receiver, the received second digitized signal comprising a second plurality of channels;
select a portion of the first plurality of channels and second plurality of channels; and
output one or more digital signals comprising the selected portion.

3. The satellite dish system of claim 2, wherein said digital channelizer comprises a polyphase filter and is operable to utilize said polyphase filter to select the portion of the plurality of channels.

4. The satellite dish system of claim 2, wherein said digital channelizer comprises an FFT engine and said selection of said portion of the plurality of channels comprises, at least in part;
utilization of said FFT engine to calculate a running FFT of the received first digitized signal received from said first full-band capture receiver; and
selection of outputs of said FFT engine for further processing.

5. The satellite dish system of claim 2, wherein said at least one module comprises a demodulator communicatively coupled to said digital channelizer and operable to, at least:
- receive the output one or more digital signals from said digital channelizer;
- convert the output one or more digital signals received from said digital channelizer to one or more transport streams; and
- output the one or more transport streams.

6. The satellite dish system of claim 5, wherein said at least one module comprises an IP bridge communicatively coupled to said demodulator and operable to encapsulate at least a portion of the one or more transport streams in IP packets.

7. The satellite dish system of claim 2, where said one or more digital signals comprising the selected portion is a single digital signal.

8. The satellite dish system of claim 1, wherein said first and second full-band capture receivers capture substantially identical frequency bands.

9. The satellite dish system of claim 1, wherein said at least one module comprises an IP bridge operable to encapsulate at least a portion of the one or more digital signals in IP packets.

10. The satellite dish system of claim 9, wherein said IP bridge is operable to perform packet identification (PID) filtering to select only a portion of the one or more digital signals for encapsulation in said IP packets.

11. The satellite dish system of claim 9, wherein said at least one module comprises a communication interface module operable to communicate the IP packets to a device external to the satellite dish system.

12. The satellite dish system of claim 11, wherein said communication interface module is operable to communicate the IP packets to the device external to the satellite dish system utilizing a communication protocol specifically adapted for communication with in-home devices over a television cable medium.

13. The satellite dish system of claim 1, where the device external to the satellite dish system is an in-the-home device.

14. The satellite dish system of claim 13, where the device external to the satellite dish system is a home gateway.

15. The satellite dish system of claim 13, where the device external to the satellite dish system is different from a set top box.

16. The satellite dish system of claim 13, where the device external to the satellite dish system is a network controller of an in-the-home communication network.

17. The satellite dish system of claim 1, where the device external to the satellite dish system is a general purpose data communication device that is not specifically adapted for satellite communication.

* * * * *